(12) United States Patent
Hattori et al.

(10) Patent No.: US 8,104,159 B2
(45) Date of Patent: Jan. 31, 2012

(54) BELT FOR CONTINUOUSLY VARIABLE TRANSMISSION AND MANUFACTURING METHOD OF THE SAME

(75) Inventors: Masashi Hattori, Anjo (JP); Katsumori Fujii, Anjo (JP); Ryo Nakamura, Anjo (JP); Hideki Makino, Tahara (JP); Yohei Ito, Tahara (JP)

(73) Assignees: Aisin AW Co., Ltd, Aichi-Ken (JP); Cvtec Co., Ltd., Tahara (JP)

( * ) Notice: Subject to any disclaimer, the term of this patent is extended or adjusted under 35 U.S.C. 154(b) by 298 days.

(21) Appl. No.: 12/412,794

(22) Filed: Mar. 27, 2009

(65) Prior Publication Data

US 2009/0182446 A1    Jul. 16, 2009

Related U.S. Application Data

(62) Division of application No. 11/300,484, filed on Dec. 15, 2005, now abandoned.

(30) Foreign Application Priority Data

Dec. 17, 2004  (JP) ................................ 2004-366910

(51) Int. Cl.
 *B23P 11/00* (2006.01)
(52) U.S. Cl. ............... 29/407.05; 29/407.01; 29/407.07; 703/7; 703/8; 474/242; 474/244
(58) Field of Classification Search ............... 29/407.01, 29/401.04, 407.07, 401.05, 428; 703/7, 8; 474/242, 244, 237, 245, 248
 See application file for complete search history.

(56) References Cited

U.S. PATENT DOCUMENTS

| | | | | |
|---|---|---|---|---|
| 3,989,780 | A | * | 11/1976 | Vorih ............................ 264/40.1 |
| 4,327,792 | A | * | 5/1982 | Landers ...................... 152/209.2 |
| 4,516,964 | A | | 5/1985 | Laster |
| 4,824,424 | A | * | 4/1989 | Ide et al. ........................ 474/242 |
| 6,363,984 | B1 | * | 4/2002 | Morgan ...................... 152/209.2 |
| 6,578,249 | B2 | | 6/2003 | Fujioka |

FOREIGN PATENT DOCUMENTS

| | | | |
|---|---|---|---|
| JP | 64-55447 | A | 3/1989 |
| JP | 1-203735 | A | 8/1989 |
| JP | 2-163543 | A | 6/1990 |
| JP | 6-21605 | B2 | 3/1994 |
| JP | 2000-274492 | A | 10/2000 |
| JP | 2002-286099 | A | 10/2002 |
| JP | 2003-74642 | A | 3/2003 |

* cited by examiner

*Primary Examiner* — David Bryant
*Assistant Examiner* — Bayan Salone
(74) *Attorney, Agent, or Firm* — Sughrue Mion, PLLC

(57) ABSTRACT

A method for manufacturing a belt for a continuously variable transmission (CVT) in which multiple V blocks of a plurality of types having different thicknesses are attached to an endless body. The method includes forming a plurality of V block groups respectively having a different ratio of different types of V blocks; and forming a series of V blocks by attaching a plurality of V blocks to the endless belt to provide said plurality of V block groups. The V block groups have different ratios of the plurality of types of V blocks to provide a belt whose noise level is low and dispersed.

11 Claims, 14 Drawing Sheets

FIG.2A
FIG.2B
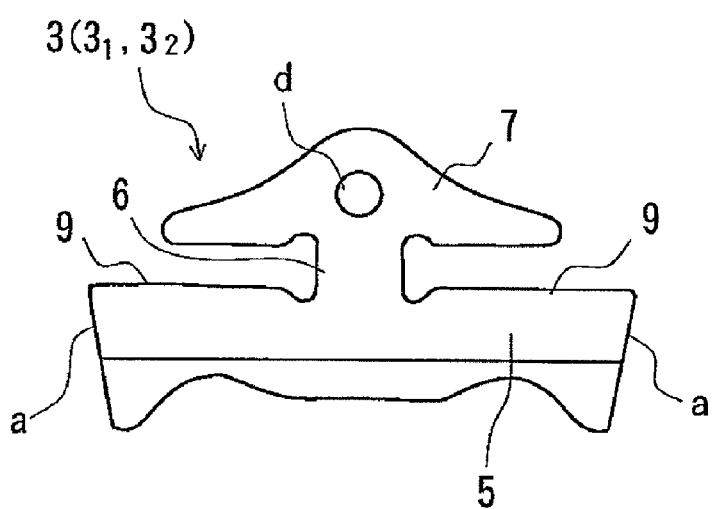
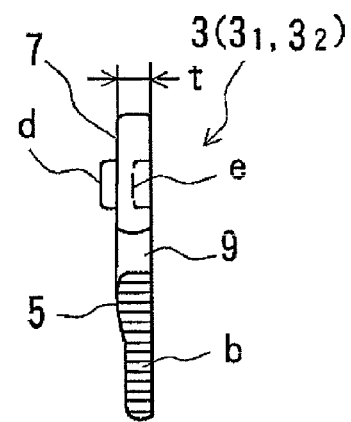

FIG.12

| NUMBER OF PIECES OF 1.5 MM | 206 |
|---|---|
| NUMBER OF PIECES OF 1.4 MM | 205 |

CASE OF ONLY MIX

| # | mm | # | mm | # | mm | # | mm | # | mm | # | mm | # | mm | # | mm |
|---|---|---|---|---|---|---|---|---|---|---|---|---|---|---|---|
| 1 | 1.4 | 51 | 1.5 | 101 | 1.4 | 151 | 1.4 | 201 | 1.4 | 251 | 1.4 | 301 | 1.5 | 351 | 1.4 | 401 | 1.4 |
| 2 | 1.5 | 52 | 1.4 | 102 | 1.5 | 152 | 1.5 | 202 | 1.5 | 252 | 1.5 | 302 | 1.5 | 352 | 1.5 | 402 | 1.5 |
| 3 | 1.4 | 53 | 1.4 | 103 | 1.4 | 153 | 1.5 | 203 | 1.4 | 253 | 1.5 | 303 | 1.5 | 353 | 1.5 | 403 | 1.5 |
| 4 | 1.4 | 54 | 1.5 | 104 | 1.5 | 154 | 1.4 | 204 | 1.4 | 254 | 1.4 | 304 | 1.4 | 354 | 1.4 | 404 | 1.5 |
| 5 | 1.5 | 55 | 1.4 | 105 | 1.5 | 155 | 1.4 | 205 | 1.5 | 255 | 1.4 | 305 | 1.4 | 355 | 1.4 | 405 | 1.5 |
| 6 | 1.4 | 56 | 1.4 | 106 | 1.5 | 156 | 1.5 | 206 | 1.5 | 256 | 1.5 | 306 | 1.5 | 356 | 1.4 | 406 | 1.4 |
| 7 | 1.4 | 57 | 1.5 | 107 | 1.5 | 157 | 1.4 | 207 | 1.4 | 257 | 1.5 | 307 | 1.4 | 357 | 1.4 | 407 | 1.4 |
| 8 | 1.5 | 58 | 1.4 | 108 | 1.4 | 158 | 1.4 | 208 | 1.4 | 258 | 1.4 | 308 | 1.4 | 358 | 1.5 | 408 | 1.5 |
| 9 | 1.4 | 59 | 1.5 | 109 | 1.5 | 159 | 1.5 | 209 | 1.5 | 259 | 1.4 | 309 | 1.4 | 359 | 1.4 | 409 | 1.5 |
| 10 | 1.5 | 60 | 1.4 | 110 | 1.4 | 160 | 1.5 | 210 | 1.4 | 260 | 1.4 | 310 | 1.4 | 360 | 1.4 | 410 | 1.4 |
| 11 | 1.5 | 61 | 1.5 | 111 | 1.4 | 161 | 1.4 | 211 | 1.5 | 261 | 1.5 | 311 | 1.5 | 361 | 1.5 | 411 | 1.5 |
| 12 | 1.5 | 62 | 1.5 | 112 | 1.5 | 162 | 1.4 | 212 | 1.4 | 262 | 1.4 | 312 | 1.5 | 362 | 1.5 | | |
| 13 | 1.5 | 63 | 1.4 | 113 | 1.4 | 163 | 1.5 | 213 | 1.5 | 263 | 1.5 | 313 | 1.5 | 363 | 1.4 | | |
| 14 | 1.5 | 64 | 1.5 | 114 | 1.4 | 164 | 1.5 | 214 | 1.5 | 264 | 1.4 | 314 | 1.5 | 364 | 1.5 | | |
| 15 | 1.4 | 65 | 1.4 | 115 | 1.4 | 165 | 1.4 | 215 | 1.5 | 265 | 1.4 | 315 | 1.4 | 365 | 1.4 | | |
| 16 | 1.4 | 66 | 1.5 | 116 | 1.5 | 166 | 1.4 | 216 | 1.4 | 266 | 1.5 | 316 | 1.4 | 366 | 1.5 | | |
| 17 | 1.5 | 67 | 1.4 | 117 | 1.5 | 167 | 1.4 | 217 | 1.5 | 267 | 1.5 | 317 | 1.5 | 367 | 1.4 | | |
| 18 | 1.5 | 68 | 1.5 | 118 | 1.4 | 168 | 1.5 | 218 | 1.4 | 268 | 1.5 | 318 | 1.5 | 368 | 1.4 | | |
| 19 | 1.4 | 69 | 1.4 | 119 | 1.4 | 169 | 1.4 | 219 | 1.5 | 269 | 1.4 | 319 | 1.5 | 369 | 1.5 | | |
| 20 | 1.4 | 70 | 1.4 | 120 | 1.5 | 170 | 1.5 | 220 | 1.5 | 270 | 1.4 | 320 | 1.5 | 370 | 1.5 | | |
| 21 | 1.5 | 71 | 1.4 | 121 | 1.4 | 171 | 1.5 | 221 | 1.4 | 271 | 1.5 | 321 | 1.5 | 371 | 1.4 | | |
| 22 | 1.4 | 72 | 1.4 | 122 | 1.5 | 172 | 1.4 | 222 | 1.5 | 272 | 1.4 | 322 | 1.5 | 372 | 1.5 | | |
| 23 | 1.5 | 73 | 1.5 | 123 | 1.4 | 173 | 1.4 | 223 | 1.5 | 273 | 1.4 | 323 | 1.4 | 373 | 1.5 | | |
| 24 | 1.5 | 74 | 1.5 | 124 | 1.5 | 174 | 1.4 | 224 | 1.5 | 274 | 1.4 | 324 | 1.4 | 374 | 1.4 | | |
| 25 | 1.4 | 75 | 1.4 | 125 | 1.4 | 175 | 1.4 | 225 | 1.5 | 275 | 1.5 | 325 | 1.4 | 375 | 1.5 | | |
| 26 | 1.4 | 76 | 1.5 | 126 | 1.5 | 176 | 1.5 | 226 | 1.5 | 276 | 1.5 | 326 | 1.5 | 376 | 1.5 | | |
| 27 | 1.5 | 77 | 1.4 | 127 | 1.5 | 177 | 1.4 | 227 | 1.5 | 277 | 1.4 | 327 | 1.4 | 377 | 1.4 | | |
| 28 | 1.4 | 78 | 1.4 | 128 | 1.5 | 178 | 1.5 | 228 | 1.5 | 278 | 1.4 | 328 | 1.4 | 378 | 1.5 | | |
| 29 | 1.4 | 79 | 1.4 | 129 | 1.5 | 179 | 1.5 | 229 | 1.4 | 279 | 1.5 | 329 | 1.4 | 379 | 1.5 | | |
| 30 | 1.5 | 80 | 1.5 | 130 | 1.4 | 180 | 1.5 | 230 | 1.4 | 280 | 1.5 | 330 | 1.5 | 380 | 1.5 | | |
| 31 | 1.5 | 81 | 1.5 | 131 | 1.5 | 181 | 1.5 | 231 | 1.4 | 281 | 1.5 | 331 | 1.4 | 381 | 1.4 | | |
| 32 | 1.4 | 82 | 1.5 | 132 | 1.4 | 182 | 1.5 | 232 | 1.5 | 282 | 1.4 | 332 | 1.4 | 382 | 1.4 | | |
| 33 | 1.5 | 83 | 1.5 | 133 | 1.5 | 183 | 1.5 | 233 | 1.5 | 283 | 1.4 | 333 | 1.4 | 383 | 1.4 | | |
| 34 | 1.4 | 84 | 1.5 | 134 | 1.4 | 184 | 1.4 | 234 | 1.5 | 284 | 1.4 | 334 | 1.4 | 384 | 1.4 | | |
| 35 | 1.4 | 85 | 1.4 | 135 | 1.5 | 185 | 1.5 | 235 | 1.5 | 285 | 1.5 | 335 | 1.5 | 385 | 1.4 | | |
| 36 | 1.5 | 86 | 1.4 | 136 | 1.5 | 186 | 1.5 | 236 | 1.4 | 286 | 1.4 | 336 | 1.4 | 386 | 1.4 | | |
| 37 | 1.4 | 87 | 1.4 | 137 | 1.5 | 187 | 1.5 | 237 | 1.4 | 287 | 1.4 | 337 | 1.5 | 387 | 1.5 | | |
| 38 | 1.5 | 88 | 1.4 | 138 | 1.4 | 188 | 1.4 | 238 | 1.5 | 288 | 1.5 | 338 | 1.5 | 388 | 1.5 | | |
| 39 | 1.5 | 89 | 1.5 | 139 | 1.4 | 189 | 1.5 | 239 | 1.4 | 289 | 1.4 | 339 | 1.5 | 389 | 1.5 | | |
| 40 | 1.5 | 90 | 1.5 | 140 | 1.5 | 190 | 1.4 | 240 | 1.4 | 290 | 1.5 | 340 | 1.5 | 390 | 1.4 | | |
| 41 | 1.5 | 91 | 1.4 | 141 | 1.4 | 191 | 1.4 | 241 | 1.4 | 291 | 1.5 | 341 | 1.5 | 391 | 1.4 | | |
| 42 | 1.4 | 92 | 1.4 | 142 | 1.5 | 192 | 1.5 | 242 | 1.5 | 292 | 1.5 | 342 | 1.5 | 392 | 1.4 | | |
| 43 | 1.4 | 93 | 1.5 | 143 | 1.5 | 193 | 1.5 | 243 | 1.4 | 293 | 1.5 | 343 | 1.5 | 393 | 1.4 | | |
| 44 | 1.4 | 94 | 1.5 | 144 | 1.5 | 194 | 1.4 | 244 | 1.4 | 294 | 1.4 | 344 | 1.4 | 394 | 1.5 | | |
| 45 | 1.5 | 95 | 1.4 | 145 | 1.4 | 195 | 1.4 | 245 | 1.4 | 295 | 1.4 | 345 | 1.4 | 395 | 1.5 | | |
| 46 | 1.4 | 96 | 1.4 | 146 | 1.4 | 196 | 1.4 | 246 | 1.5 | 296 | 1.4 | 346 | 1.5 | 396 | 1.5 | | |
| 47 | 1.5 | 97 | 1.5 | 147 | 1.5 | 197 | 1.4 | 247 | 1.5 | 297 | 1.4 | 347 | 1.4 | 397 | 1.4 | | |
| 48 | 1.5 | 98 | 1.4 | 148 | 1.4 | 198 | 1.4 | 248 | 1.4 | 298 | 1.4 | 348 | 1.4 | 398 | 1.4 | | |
| 49 | 1.4 | 99 | 1.5 | 149 | 1.5 | 199 | 1.4 | 249 | 1.5 | 299 | 1.4 | 349 | 1.4 | 399 | 1.5 | | |
| 50 | 1.5 | 100 | 1.5 | 150 | 1.4 | 200 | 1.4 | 250 | 1.5 | 300 | 1.5 | 350 | 1.5 | 400 | 1.5 | | |

FIG.13

| NUMBER OF PIECES OF 1.5 MM | 215 |
|---|---|
| NUMBER OF PIECES OF 1.4 MM | 195 |

CASE OF COMBINATION SPECIFIED
RATIO OF ELEMENTS OF 1.5 MM AND 1.4 MM IS 3:7 AND 7:3 IN FRONT AND REAR HALVES

| # | mm | # | mm | # | mm | # | mm | # | mm | # | mm | # | mm | # | mm | # | mm |
|---|---|---|---|---|---|---|---|---|---|---|---|---|---|---|---|---|---|
| 1 | 1.5 | 51 | 1.4 | 101 | 1.4 | 151 | 1.4 | 201 | 1.4 | 251 | 1.5 | 301 | 1.5 | 351 | 1.5 | 401 | 1.4 |
| 2 | 1.5 | 52 | 1.5 | 102 | 1.4 | 152 | 1.4 | 202 | 1.4 | 252 | 1.5 | 302 | 1.5 | 352 | 1.5 | 402 | 1.4 |
| 3 | 1.4 | 53 | 1.5 | 103 | 1.4 | 153 | 1.4 | 203 | 1.4 | 253 | 1.5 | 303 | 1.5 | 353 | 1.5 | 403 | 1.5 |
| 4 | 1.4 | 54 | 1.4 | 104 | 1.5 | 154 | 1.5 | 204 | 1.4 | 254 | 1.5 | 304 | 1.5 | 354 | 1.5 | 404 | 1.5 |
| 5 | 1.5 | 55 | 1.4 | 105 | 1.4 | 155 | 1.5 | 205 | 1.4 | 255 | 1.5 | 305 | 1.5 | 355 | 1.5 | 405 | 1.5 |
| 6 | 1.4 | 56 | 1.4 | 106 | 1.5 | 156 | 1.4 | 206 | 1.4 | 256 | 1.5 | 306 | 1.5 | 356 | 1.5 | 406 | 1.5 |
| 7 | 1.5 | 57 | 1.4 | 107 | 1.5 | 157 | 1.4 | 207 | 1.4 | 257 | 1.5 | 307 | 1.5 | 357 | 1.5 | 407 | 1.5 |
| 8 | 1.4 | 58 | 1.4 | 108 | 1.4 | 158 | 1.4 | 208 | 1.4 | 258 | 1.5 | 308 | 1.5 | 358 | 1.5 | 408 | 1.4 |
| 9 | 1.4 | 59 | 1.4 | 109 | 1.5 | 159 | 1.4 | 209 | 1.4 | 259 | 1.5 | 309 | 1.5 | 359 | 1.5 | 409 | 1.5 |
| 10 | 1.4 | 60 | 1.4 | 110 | 1.4 | 160 | 1.5 | 210 | 1.5 | 260 | 1.4 | 310 | 1.5 | 360 | 1.4 | 410 | 1.5 |
| 11 | 1.4 | 61 | 1.4 | 111 | 1.4 | 161 | 1.5 | 211 | 1.4 | 261 | 1.5 | 311 | 1.4 | 361 | 1.4 | | |
| 12 | 1.4 | 62 | 1.4 | 112 | 1.5 | 162 | 1.4 | 212 | 1.5 | 262 | 1.4 | 312 | 1.5 | 362 | 1.4 | | |
| 13 | 1.5 | 63 | 1.4 | 113 | 1.5 | 163 | 1.4 | 213 | 1.5 | 263 | 1.5 | 313 | 1.5 | 363 | 1.4 | | |
| 14 | 1.4 | 64 | 1.4 | 114 | 1.4 | 164 | 1.5 | 214 | 1.4 | 264 | 1.4 | 314 | 1.5 | 364 | 1.5 | | |
| 15 | 1.5 | 65 | 1.5 | 115 | 1.4 | 165 | 1.5 | 215 | 1.5 | 265 | 1.5 | 315 | 1.4 | 365 | 1.5 | | |
| 16 | 1.4 | 66 | 1.4 | 116 | 1.4 | 166 | 1.5 | 216 | 1.5 | 266 | 1.5 | 316 | 1.5 | 366 | 1.4 | | |
| 17 | 1.4 | 67 | 1.5 | 117 | 1.5 | 167 | 1.4 | 217 | 1.4 | 267 | 1.5 | 317 | 1.5 | 367 | 1.4 | | |
| 18 | 1.5 | 68 | 1.4 | 118 | 1.4 | 168 | 1.5 | 218 | 1.5 | 268 | 1.4 | 318 | 1.5 | 368 | 1.5 | | |
| 19 | 1.4 | 69 | 1.5 | 119 | 1.5 | 169 | 1.4 | 219 | 1.5 | 269 | 1.5 | 319 | 1.5 | 369 | 1.5 | | |
| 20 | 1.5 | 70 | 1.4 | 120 | 1.5 | 170 | 1.4 | 220 | 1.5 | 270 | 1.5 | 320 | 1.5 | 370 | 1.5 | | |
| 21 | 1.4 | 71 | 1.4 | 121 | 1.4 | 171 | 1.4 | 221 | 1.4 | 271 | 1.4 | 321 | 1.5 | 371 | 1.5 | | |
| 22 | 1.4 | 72 | 1.5 | 122 | 1.4 | 172 | 1.5 | 222 | 1.5 | 272 | 1.5 | 322 | 1.4 | 372 | 1.5 | | |
| 23 | 1.4 | 73 | 1.4 | 123 | 1.4 | 173 | 1.5 | 223 | 1.4 | 273 | 1.4 | 323 | 1.5 | 373 | 1.5 | | |
| 24 | 1.4 | 74 | 1.4 | 124 | 1.4 | 174 | 1.4 | 224 | 1.5 | 274 | 1.5 | 324 | 1.4 | 374 | 1.4 | | |
| 25 | 1.5 | 75 | 1.5 | 125 | 1.5 | 175 | 1.5 | 225 | 1.5 | 275 | 1.4 | 325 | 1.4 | 375 | 1.5 | | |
| 26 | 1.4 | 76 | 1.4 | 126 | 1.5 | 176 | 1.5 | 226 | 1.5 | 276 | 1.4 | 326 | 1.5 | 376 | 1.5 | | |
| 27 | 1.4 | 77 | 1.4 | 127 | 1.4 | 177 | 1.4 | 227 | 1.5 | 277 | 1.5 | 327 | 1.5 | 377 | 1.4 | | |
| 28 | 1.5 | 78 | 1.5 | 128 | 1.4 | 178 | 1.5 | 228 | 1.5 | 278 | 1.4 | 328 | 1.5 | 378 | 1.5 | | |
| 29 | 1.4 | 79 | 1.5 | 129 | 1.5 | 179 | 1.4 | 229 | 1.5 | 279 | 1.5 | 329 | 1.5 | 379 | 1.5 | | |
| 30 | 1.4 | 80 | 1.5 | 130 | 1.4 | 180 | 1.5 | 230 | 1.5 | 280 | 1.5 | 330 | 1.4 | 380 | 1.5 | | |
| 31 | 1.4 | 81 | 1.5 | 131 | 1.4 | 181 | 1.5 | 231 | 1.5 | 281 | 1.4 | 331 | 1.4 | 381 | 1.5 | | |
| 32 | 1.5 | 82 | 1.4 | 132 | 1.5 | 182 | 1.4 | 232 | 1.5 | 282 | 1.5 | 332 | 1.5 | 382 | 1.5 | | |
| 33 | 1.4 | 83 | 1.4 | 133 | 1.4 | 183 | 1.4 | 233 | 1.5 | 283 | 1.5 | 333 | 1.5 | 383 | 1.5 | | |
| 34 | 1.4 | 84 | 1.4 | 134 | 1.4 | 184 | 1.4 | 234 | 1.5 | 284 | 1.4 | 334 | 1.5 | 384 | 1.5 | | |
| 35 | 1.4 | 85 | 1.4 | 135 | 1.4 | 185 | 1.4 | 235 | 1.4 | 285 | 1.5 | 335 | 1.5 | 385 | 1.5 | | |
| 36 | 1.4 | 86 | 1.4 | 136 | 1.4 | 186 | 1.4 | 236 | 1.5 | 286 | 1.5 | 336 | 1.4 | 386 | 1.5 | | |
| 37 | 1.5 | 87 | 1.4 | 137 | 1.4 | 187 | 1.5 | 237 | 1.5 | 287 | 1.5 | 337 | 1.4 | 387 | 1.4 | | |
| 38 | 1.5 | 88 | 1.4 | 138 | 1.5 | 188 | 1.4 | 238 | 1.5 | 288 | 1.5 | 338 | 1.5 | 388 | 1.5 | | |
| 39 | 1.5 | 89 | 1.4 | 139 | 1.5 | 189 | 1.4 | 239 | 1.5 | 289 | 1.4 | 339 | 1.5 | 389 | 1.4 | | |
| 40 | 1.5 | 90 | 1.4 | 140 | 1.4 | 190 | 1.4 | 240 | 1.5 | 290 | 1.5 | 340 | 1.5 | 390 | 1.5 | | |
| 41 | 1.4 | 91 | 1.4 | 141 | 1.4 | 191 | 1.4 | 241 | 1.5 | 291 | 1.5 | 341 | 1.4 | 391 | 1.5 | | |
| 42 | 1.4 | 92 | 1.4 | 142 | 1.4 | 192 | 1.4 | 242 | 1.5 | 292 | 1.5 | 342 | 1.5 | 392 | 1.4 | | |
| 43 | 1.4 | 93 | 1.4 | 143 | 1.5 | 193 | 1.5 | 243 | 1.4 | 293 | 1.5 | 343 | 1.4 | 393 | 1.4 | | |
| 44 | 1.5 | 94 | 1.5 | 144 | 1.4 | 194 | 1.4 | 244 | 1.5 | 294 | 1.5 | 344 | 1.4 | 394 | 1.4 | | |
| 45 | 1.5 | 95 | 1.5 | 145 | 1.5 | 195 | 1.4 | 245 | 1.5 | 295 | 1.5 | 345 | 1.5 | 395 | 1.5 | | |
| 46 | 1.5 | 96 | 1.5 | 146 | 1.4 | 196 | 1.5 | 246 | 1.5 | 296 | 1.5 | 346 | 1.5 | 396 | 1.4 | | |
| 47 | 1.4 | 97 | 1.4 | 147 | 1.4 | 197 | 1.4 | 247 | 1.5 | 297 | 1.4 | 347 | 1.5 | 397 | 1.5 | | |
| 48 | 1.4 | 98 | 1.5 | 148 | 1.4 | 198 | 1.4 | 248 | 1.5 | 298 | 1.5 | 348 | 1.4 | 398 | 1.4 | | |
| 49 | 1.5 | 99 | 1.4 | 149 | 1.4 | 199 | 1.4 | 249 | 1.5 | 299 | 1.5 | 349 | 1.4 | 399 | 1.5 | | |
| 50 | 1.4 | 100 | 1.4 | 150 | 1.4 | 200 | 1.4 | 250 | 1.5 | 300 | 1.4 | 350 | 1.5 | 400 | 1.5 | | |

FIG.14

| NUMBER OF PIECES OF 1.5 MM | 195 |
|---|---|
| NUMBER OF PIECES OF 1.4 MM | 216 |

COMBINATION AND ARRANGEMENT SPECIFIED
BEST PATTERN AMONG 1000 COMBINATION SPECIFIED PATTERNS IMPLEMENTED
RATIO OF ELEMENTS OF 1.5 MM AND 1.4 MM IS 3:7 AND 7:3 IN FRONT AND REAR HALVES

| # | | # | | # | | # | | # | | # | | # | | # | | # | |
|---|---|---|---|---|---|---|---|---|---|---|---|---|---|---|---|---|---|
| 1 | 1.4 | 51 | 1.4 | 101 | 1.4 | 151 | 1.4 | 201 | 1.5 | 251 | 1.4 | 301 | 1.5 | 351 | 1.4 | 401 | 1.4 |
| 2 | 1.4 | 52 | 1.4 | 102 | 1.4 | 152 | 1.4 | 202 | 1.5 | 252 | 1.5 | 302 | 1.5 | 352 | 1.5 | 402 | 1.5 |
| 3 | 1.4 | 53 | 1.4 | 103 | 1.4 | 153 | 1.5 | 203 | 1.4 | 253 | 1.5 | 303 | 1.5 | 353 | 1.5 | 403 | 1.5 |
| 4 | 1.4 | 54 | 1.5 | 104 | 1.5 | 154 | 1.5 | 204 | 1.4 | 254 | 1.5 | 304 | 1.5 | 354 | 1.4 | 404 | 1.5 |
| 5 | 1.5 | 55 | 1.4 | 105 | 1.4 | 155 | 1.4 | 205 | 1.4 | 255 | 1.5 | 305 | 1.5 | 355 | 1.5 | 405 | 1.4 |
| 6 | 1.4 | 56 | 1.4 | 106 | 1.4 | 156 | 1.4 | 206 | 1.4 | 256 | 1.4 | 306 | 1.4 | 356 | 1.5 | 406 | 1.5 |
| 7 | 1.4 | 57 | 1.4 | 107 | 1.4 | 157 | 1.4 | 207 | 1.4 | 257 | 1.5 | 307 | 1.5 | 357 | 1.5 | 407 | 1.5 |
| 8 | 1.4 | 58 | 1.4 | 108 | 1.5 | 158 | 1.4 | 208 | 1.4 | 258 | 1.4 | 308 | 1.5 | 358 | 1.4 | 408 | 1.5 |
| 9 | 1.4 | 59 | 1.4 | 109 | 1.4 | 159 | 1.4 | 209 | 1.4 | 259 | 1.5 | 309 | 1.5 | 359 | 1.4 | 409 | 1.4 |
| 10 | 1.4 | 60 | 1.4 | 110 | 1.4 | 160 | 1.4 | 210 | 1.5 | 260 | 1.5 | 310 | 1.5 | 360 | 1.5 | 410 | 1.5 |
| 11 | 1.5 | 61 | 1.4 | 111 | 1.4 | 161 | 1.5 | 211 | 1.5 | 261 | 1.5 | 311 | 1.4 | 361 | 1.5 | 411 | 1.4 |
| 12 | 1.4 | 62 | 1.4 | 112 | 1.4 | 162 | 1.4 | 212 | 1.5 | 262 | 1.5 | 312 | 1.5 | 362 | 1.5 | | |
| 13 | 1.4 | 63 | 1.4 | 113 | 1.4 | 163 | 1.4 | 213 | 1.4 | 263 | 1.5 | 313 | 1.4 | 363 | 1.5 | | |
| 14 | 1.4 | 64 | 1.4 | 114 | 1.5 | 164 | 1.5 | 214 | 1.5 | 264 | 1.5 | 314 | 1.4 | 364 | 1.5 | | |
| 15 | 1.5 | 65 | 1.4 | 115 | 1.5 | 165 | 1.4 | 215 | 1.4 | 265 | 1.5 | 315 | 1.5 | 365 | 1.4 | | |
| 16 | 1.4 | 66 | 1.5 | 116 | 1.4 | 166 | 1.5 | 216 | 1.5 | 266 | 1.5 | 316 | 1.4 | 366 | 1.5 | | |
| 17 | 1.5 | 67 | 1.4 | 117 | 1.4 | 167 | 1.5 | 217 | 1.4 | 267 | 1.5 | 317 | 1.5 | 367 | 1.5 | | |
| 18 | 1.4 | 68 | 1.5 | 118 | 1.4 | 168 | 1.4 | 218 | 1.5 | 268 | 1.5 | 318 | 1.5 | 368 | 1.5 | | |
| 19 | 1.5 | 69 | 1.4 | 119 | 1.4 | 169 | 1.4 | 219 | 1.5 | 269 | 1.4 | 319 | 1.5 | 369 | 1.4 | | |
| 20 | 1.5 | 70 | 1.4 | 120 | 1.4 | 170 | 1.4 | 220 | 1.5 | 270 | 1.4 | 320 | 1.5 | 370 | 1.4 | | |
| 21 | 1.5 | 71 | 1.4 | 121 | 1.4 | 171 | 1.4 | 221 | 1.5 | 271 | 1.5 | 321 | 1.4 | 371 | 1.5 | | |
| 22 | 1.4 | 72 | 1.5 | 122 | 1.4 | 172 | 1.4 | 222 | 1.5 | 272 | 1.4 | 322 | 1.5 | 372 | 1.5 | | |
| 23 | 1.5 | 73 | 1.5 | 123 | 1.4 | 173 | 1.5 | 223 | 1.5 | 273 | 1.5 | 323 | 1.4 | 373 | 1.4 | | |
| 24 | 1.4 | 74 | 1.5 | 124 | 1.4 | 174 | 1.4 | 224 | 1.5 | 274 | 1.4 | 324 | 1.4 | 374 | 1.5 | | |
| 25 | 1.4 | 75 | 1.4 | 125 | 1.4 | 175 | 1.4 | 225 | 1.4 | 275 | 1.4 | 325 | 1.5 | 375 | 1.5 | | |
| 26 | 1.4 | 76 | 1.5 | 126 | 1.5 | 176 | 1.5 | 226 | 1.5 | 276 | 1.4 | 326 | 1.4 | 376 | 1.4 | | |
| 27 | 1.4 | 77 | 1.4 | 127 | 1.4 | 177 | 1.5 | 227 | 1.5 | 277 | 1.5 | 327 | 1.5 | 377 | 1.5 | | |
| 28 | 1.4 | 78 | 1.4 | 128 | 1.5 | 178 | 1.4 | 228 | 1.4 | 278 | 1.5 | 328 | 1.5 | 378 | 1.5 | | |
| 29 | 1.5 | 79 | 1.5 | 129 | 1.4 | 179 | 1.5 | 229 | 1.5 | 279 | 1.4 | 329 | 1.5 | 379 | 1.5 | | |
| 30 | 1.4 | 80 | 1.4 | 130 | 1.5 | 180 | 1.4 | 230 | 1.5 | 280 | 1.5 | 330 | 1.4 | 380 | 1.5 | | |
| 31 | 1.4 | 81 | 1.4 | 131 | 1.4 | 181 | 1.4 | 231 | 1.5 | 281 | 1.5 | 331 | 1.4 | 381 | 1.5 | | |
| 32 | 1.4 | 82 | 1.4 | 132 | 1.5 | 182 | 1.4 | 232 | 1.5 | 282 | 1.5 | 332 | 1.5 | 382 | 1.5 | | |
| 33 | 1.4 | 83 | 1.5 | 133 | 1.4 | 183 | 1.4 | 233 | 1.5 | 283 | 1.5 | 333 | 1.4 | 383 | 1.5 | | |
| 34 | 1.4 | 84 | 1.4 | 134 | 1.4 | 184 | 1.5 | 234 | 1.5 | 284 | 1.5 | 334 | 1.5 | 384 | 1.5 | | |
| 35 | 1.4 | 85 | 1.4 | 135 | 1.4 | 185 | 1.4 | 235 | 1.5 | 285 | 1.4 | 335 | 1.5 | 385 | 1.5 | | |
| 36 | 1.5 | 86 | 1.4 | 136 | 1.4 | 186 | 1.4 | 236 | 1.5 | 286 | 1.5 | 336 | 1.4 | 386 | 1.5 | | |
| 37 | 1.4 | 87 | 1.4 | 137 | 1.4 | 187 | 1.4 | 237 | 1.5 | 287 | 1.5 | 337 | 1.4 | 387 | 1.5 | | |
| 38 | 1.4 | 88 | 1.4 | 138 | 1.4 | 188 | 1.4 | 238 | 1.5 | 288 | 1.5 | 338 | 1.4 | 388 | 1.5 | | |
| 39 | 1.4 | 89 | 1.5 | 139 | 1.5 | 189 | 1.4 | 239 | 1.5 | 289 | 1.4 | 339 | 1.4 | 389 | 1.4 | | |
| 40 | 1.4 | 90 | 1.4 | 140 | 1.4 | 190 | 1.4 | 240 | 1.5 | 290 | 1.4 | 340 | 1.5 | 390 | 1.5 | | |
| 41 | 1.4 | 91 | 1.4 | 141 | 1.5 | 191 | 1.4 | 241 | 1.5 | 291 | 1.4 | 341 | 1.5 | 391 | 1.4 | | |
| 42 | 1.4 | 92 | 1.4 | 142 | 1.5 | 192 | 1.5 | 242 | 1.5 | 292 | 1.5 | 342 | 1.4 | 392 | 1.5 | | |
| 43 | 1.4 | 93 | 1.4 | 143 | 1.4 | 193 | 1.5 | 243 | 1.5 | 293 | 1.4 | 343 | 1.5 | 393 | 1.5 | | |
| 44 | 1.4 | 94 | 1.4 | 144 | 1.4 | 194 | 1.5 | 244 | 1.5 | 294 | 1.4 | 344 | 1.4 | 394 | 1.5 | | |
| 45 | 1.4 | 95 | 1.5 | 145 | 1.5 | 195 | 1.5 | 245 | 1.4 | 295 | 1.5 | 345 | 1.4 | 395 | 1.4 | | |
| 46 | 1.4 | 96 | 1.4 | 146 | 1.5 | 196 | 1.4 | 246 | 1.4 | 296 | 1.5 | 346 | 1.5 | 396 | 1.5 | | |
| 47 | 1.4 | 97 | 1.4 | 147 | 1.5 | 197 | 1.4 | 247 | 1.5 | 297 | 1.5 | 347 | 1.4 | 397 | 1.4 | | |
| 48 | 1.4 | 98 | 1.4 | 148 | 1.4 | 198 | 1.4 | 248 | 1.4 | 298 | 1.4 | 348 | 1.5 | 398 | 1.5 | | |
| 49 | 1.4 | 99 | 1.5 | 149 | 1.5 | 199 | 1.5 | 249 | 1.5 | 299 | 1.5 | 349 | 1.4 | 399 | 1.4 | | |
| 50 | 1.5 | 100 | 1.5 | 150 | 1.5 | 200 | 1.4 | 250 | 1.4 | 300 | 1.4 | 350 | 1.4 | 400 | 1.4 | | |

BELT FOR CONTINUOUSLY VARIABLE TRANSMISSION AND MANUFACTURING METHOD OF THE SAME

CROSS-REFERENCE TO RELATED PATENT APPLICATION

This is a divisional of application Ser. No. 11/300,484, filed Dec. 15, 2005, which claims priority from Japanese Patent Application No. 2004-366910, filed Dec. 17, 2004, the disclosures of which are incorporated herein by reference in their entirety.

BACKGROUND OF THE INVENTION

1. Field of the Invention

Apparatuses and methods consistent with the present invention relate to a belt for a continuously variable transmission which is wound across a primary pulley and a secondary pulley each composed of a pair of sheaves and, more specifically, to a belt for a continuously variable transmission whose noise is reduced by using V blocks having different thickness for the large number of V blocks that abut against the pulleys.

2. Description of Related Art

A belt type continuously variable transmission (hereinafter abbreviated as CVT) is generally used for power transmission systems of cars and the like. Belts for the CVTs typically include V blocks that are continuously attached to an endless body. In terms of the endless body, there is a push-type endless body that uses a ring composed of a plurality of laminated metal plates that transmits power by exerting a compression force on the V blocks, and a pull-type endless body that uses a chain in which link plates are linked alternately by pins and that transmits power by a tensile force acting on the chain. Although the present invention has been developed for the push-type endless body, it is also applicable to the pull-type endless body.

Belts for CVTs generate an abutment sound when the V blocks (elements) abut against the pulleys. The sound becomes irritating to human ears at a peak frequency when the thicknesses of the V blocks are the same.

Conventionally, belts have provided a lower noise by dispersing the peak frequency, described above, by randomly disposing a plurality of types of blocks having different thicknesses, as disclosed in Japanese Patent Publication No. 1994-21605 and Japanese Patent Laid-Open No. 2000-274492, for example. Although the belt in which the blocks, having different thickness, are attached at random (hereinafter referred to as a randomly mixed belt) can lower the frequency peak by dispersing the noise, its effect is not enough and a noise is still produced that irritates human ears.

As shown in FIG. 6, a belt $1_1$ assembled by 400 blocks (elements) 3 having a thickness of only 1.5 mm generates noise having a very narrow peak on a bite-in order of the blocks to the pulley.

Although a randomly mixed belt $1_2$, in which the same number (200) of blocks (elements) having a thickness of 1.4 mm and blocks (elements) having a thickness of 1.5 mm are mixed and arranged at random, can lower the frequency peak by white noise centering on an order equivalent to 1.45 mm, which is the mean value between 1.4 mm and 1.5 mm as shown in FIG. 7, noise is still generated that is irritating to human ears.

BRIEF SUMMARY OF THE INVENTION

It is an aspect of the invention to provide a belt for a CVT that disperses a peak of the frequency and lowers noise by forming a plurality of block groups having different ratios of blocks with different thicknesses.

According to a first exemplary aspect of the invention, there is provided a method for manufacturing a belt for a continuously variable transmission (CVT) in which multiple V blocks of a plurality of types having different thicknesses are attached to an endless body, comprising forming a plurality of V block groups respectively having a different ratio of different types of V blocks and forming a series of V blocks by attaching a plurality of V blocks to the endless belt to provide said plurality of V block groups.

The forming of the V block groups may include dividing the V blocks into the plurality of V block groups, respectively having a different ratio of different types of V blocks and specifying an arrangement of the V blocks. The operation of specifying the arrangement may comprise assembling a series of belts, including the V block groups, on a computer, and simulating a state in which the assembled belts are wound across pulleys to calculate noise levels of the individual belts, so as to analyze the calculated noise level of each belt to determine an optimum belt configuration.

According to a further exemplary aspect of the invention, the method for manufacturing the belt for a CVT comprises dividing V blocks into a plurality of V block groups respectively having a different ratio of different types of V blocks, and specifying a plurality of arrangements of the V blocks for the V block groups to assemble a series of belts for simulation on a computer. The belts are simulated in a state in which the plurality of the belts are individually wound across pulleys to calculate noise levels on the computer, so as to calculate the noise level of each belt and analyze the calculated noise levels to determine an optimum belt configuration.

Since the belts for a CVT of the present invention are composed of a plurality of V block groups having a different combination ratio of V blocks, they can disperse noise further when compared to the traditional randomly mixed belt and can reduce a rasping noise which is otherwise disturbing to human ears. The belt may be readily assembled by randomly arranging the V blocks in the V block groups. The noise may be reduced further by arranging the V blocks in the V block groups with a predetermined order that even further reduces the noise level.

The belt may be readily assembled with fewer types of V blocks and its cost lowered by forming the V block groups with two types of V blocks having different thicknesses and by forming the series of belts using two V block groups.

The number of different types of V blocks used may be equalized, thus improving efficiency in assembly and yield by equalizing the number of V blocks in the series or by inverting the ratios of the combinations of the V blocks in the two V block groups.

As will be appreciated, the invention may be suitably applied to a belt whose endless body is a metal ring, such that the V blocks are attached successively to reduce noise.

Further, the inventive belt manufacturing method enables an optimum arrangement of V blocks, causing less of a noise level, which can be analyzed through computer simulation, for example.

BRIEF DESCRIPTION OF THE DRAWINGS

The above and/or other aspects of the present invention will be more apparent by describing certain exemplary embodiments of the present invention with reference to the accompanying drawings, in which:

FIGS. 2A and 2B show a V block, wherein FIG. 2A is a front view and FIG. 2B is a side view thereof.

FIG. 12 is a table showing an example of a conventional belt.

FIG. 13 is a table showing an example of the combination specified belt.

FIG. 14 is a table showing an example of the combination and arrangement specified belt.

DETAILED DESCRIPTION OF THE INVENTION

Figure 1:
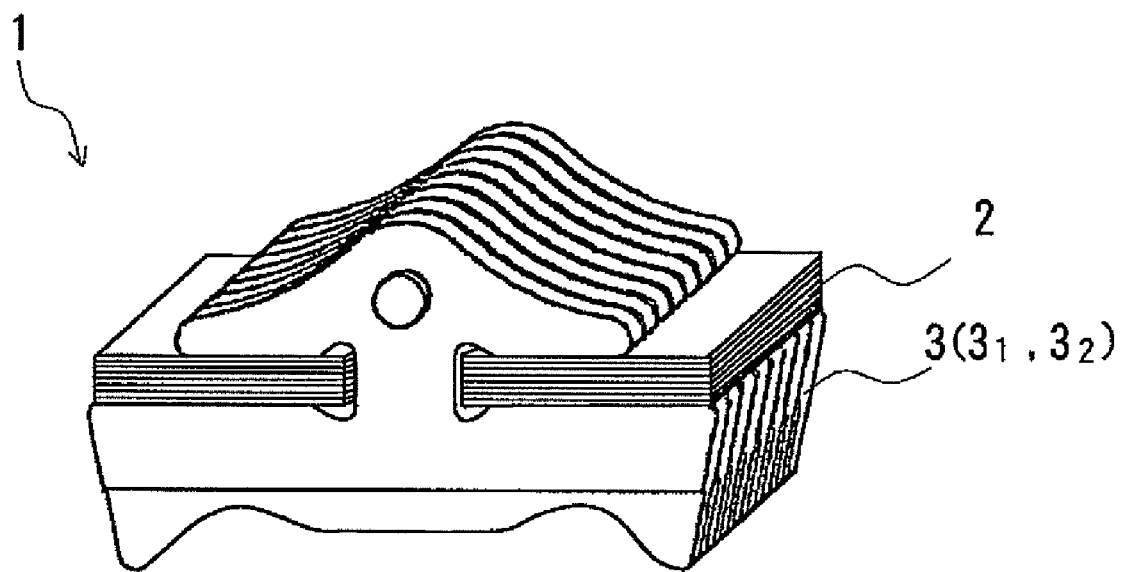
FIG. 1 is a partial perspective view of a CVT belt to which the invention is applicable.

Exemplary modes for carrying out the invention will be explained below with reference to the accompanying drawings. FIG. 1 is a perspective view showing a part of a CVT belt and FIGS. 2A and 2B show a V block (element). The belt 1 is composed of a ring 2 in which a plurality of endless metal sheets are laminated and a large number of V blocks (elements) 3 are successively and endlessly attached to the ring 2. As shown in FIG. 2, in detail, the V block 3 is a plate made of steel, for example, and has a certain thickness. The V block has a body 5 with V-shaped right and left flanks a that abut against pulleys, and a head 7 linked with the body 5 via a pillar 6. A part between the body 5 and the head 7 on the right and left sides of the pillar 6 is a saddle 9 for receiving the ring 2. Channels b for flowing lubricant oil are formed on the right and left flanks a, and the head 7 is provided with a dimple d on one face thereof and with a hole e on the other face to maintain the attitude of each block.

Figure 3:
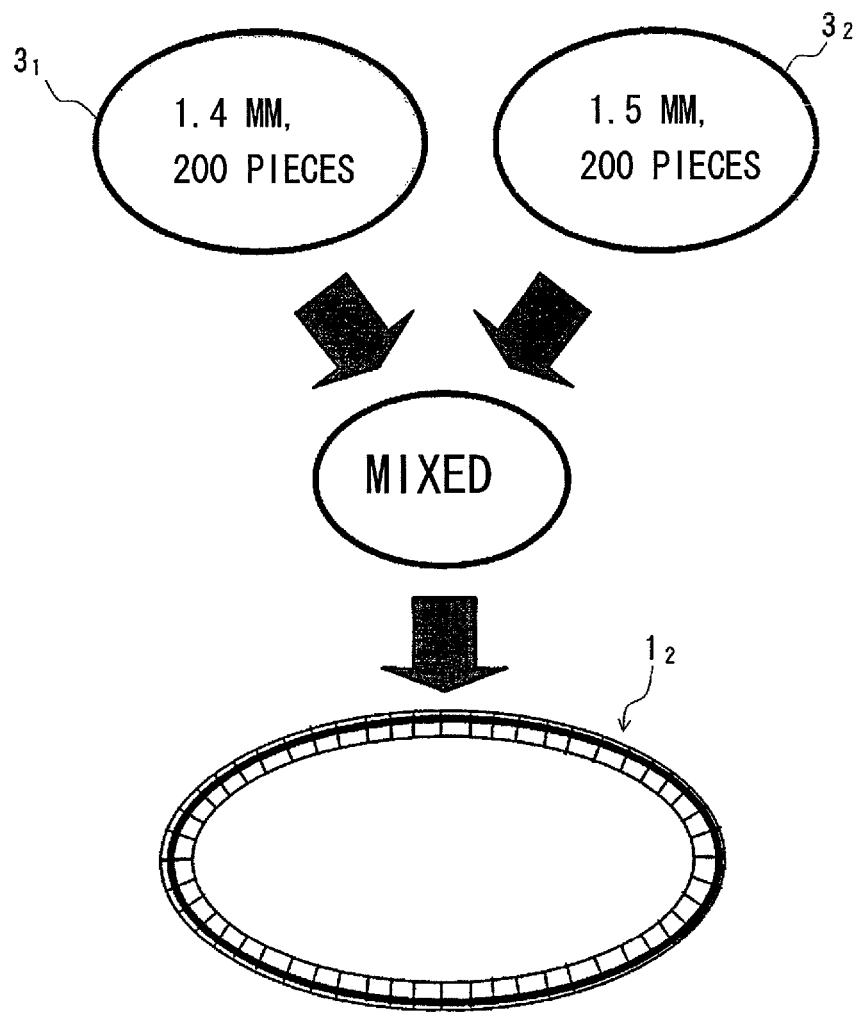
FIG. 3 is a drawing for explaining a randomly mixed belt.

In the conventional, randomly mixed belt, a plurality of types of V blocks 3 having different thickness t are provided. In particular, there are first V blocks (elements) $3_1$ whose thickness is 1.4 mm and second V blocks (elements) $3_2$ whose thickness is 1.5 mm. The external shape of the both blocks $3_1$ and $3_2$ is the same. The conventional randomly mixed belt $1_2$ described above is built by 400 blocks in total wherein 200 pieces of a first block $3_1$ and 200 pieces of a second block $3_2$ are mixed and arranged at random as shown in FIG. 3.

Figure 4:
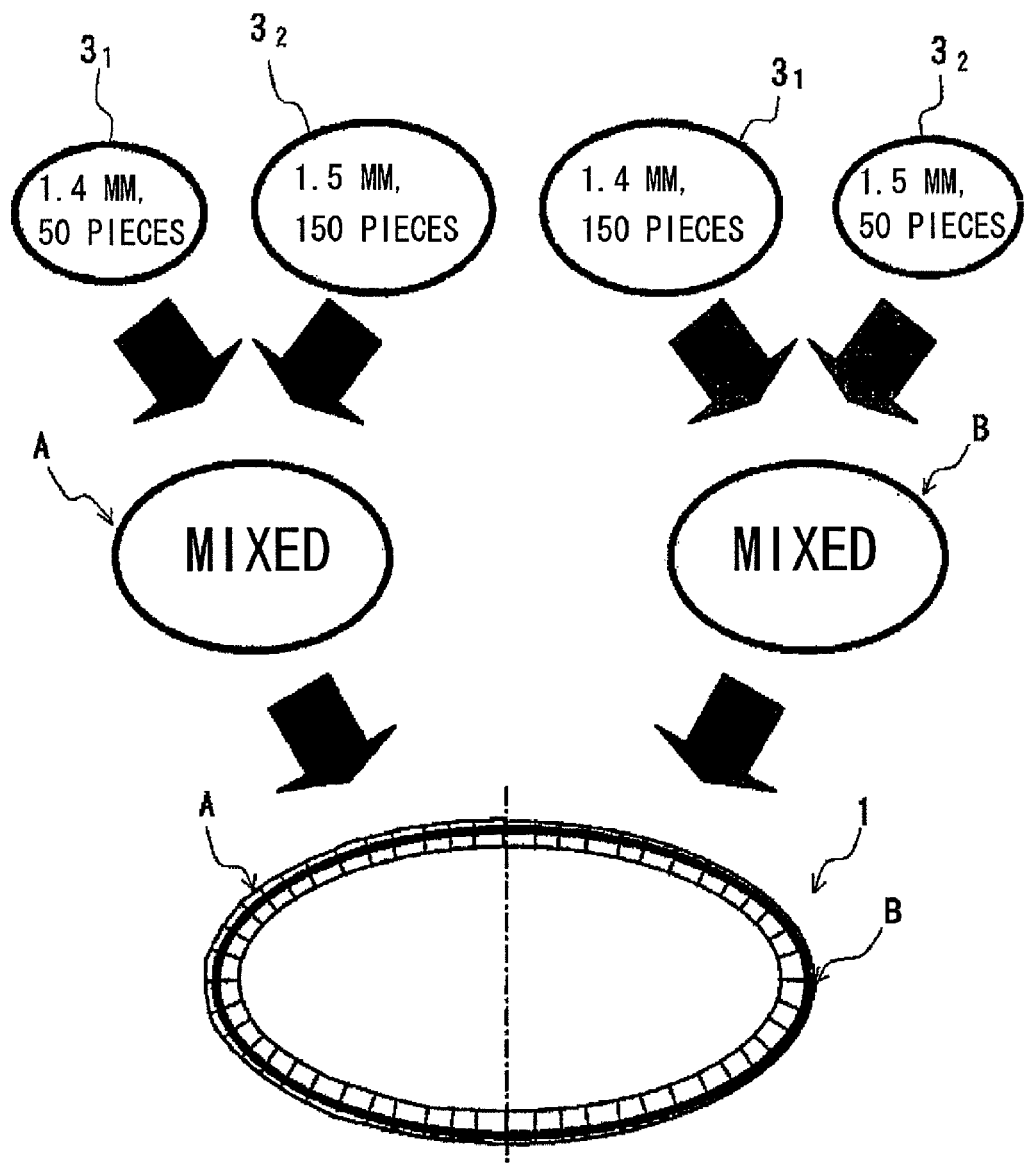
FIG. 4 is a drawing for explaining a combination specified belt.

Contrary to the convention belt, each half of an exemplary embodiment of a combination specified belt 1 of the present invention is composed of a first V block group A in which 50 pieces of a first V block $3_1$ and 150 pieces of a second V block $3_2$ are mixed, and a second V block group B in which 150 pieces of first V block $3_1$ and 50 pieces of a second V block $3_2$ are mixed, respectively, as shown in FIG. 4. That is, half of the combination specified belt 1 is composed of the first V block group A in which the first and second V blocks $3_1$ and $3_2$ are mixed with a ratio of one-to-three and are arranged at random, and the remaining half is composed of the second V block group B in which the first V blocks $3_1$ and the second V blocks $3_2$ are mixed with a ratio of three-to-one and are arranged at random. It is noted that the ratio of the first and second V blocks is not limited to be one-to-three as described above and may be another ratio such as one-to-two, two-to-three, one-to-four and three-to-seven, or the like. Still more, the number of block groups is not limited to two groups but may be many groups such as three or four groups, for example. Still more, the number of the blocks having different thickness is not limited to two but may be more such as three and four types, for example. It is noted that the number of the first V blocks is equalized with that of the second V blocks in the whole belt, thus improving efficiency in assembly and yield, by reversing the relationship of the first and second V block groups A and B to set the ratio of the first and second blocks as three-to-seven and three-to-seven, for example.

Figure 5:
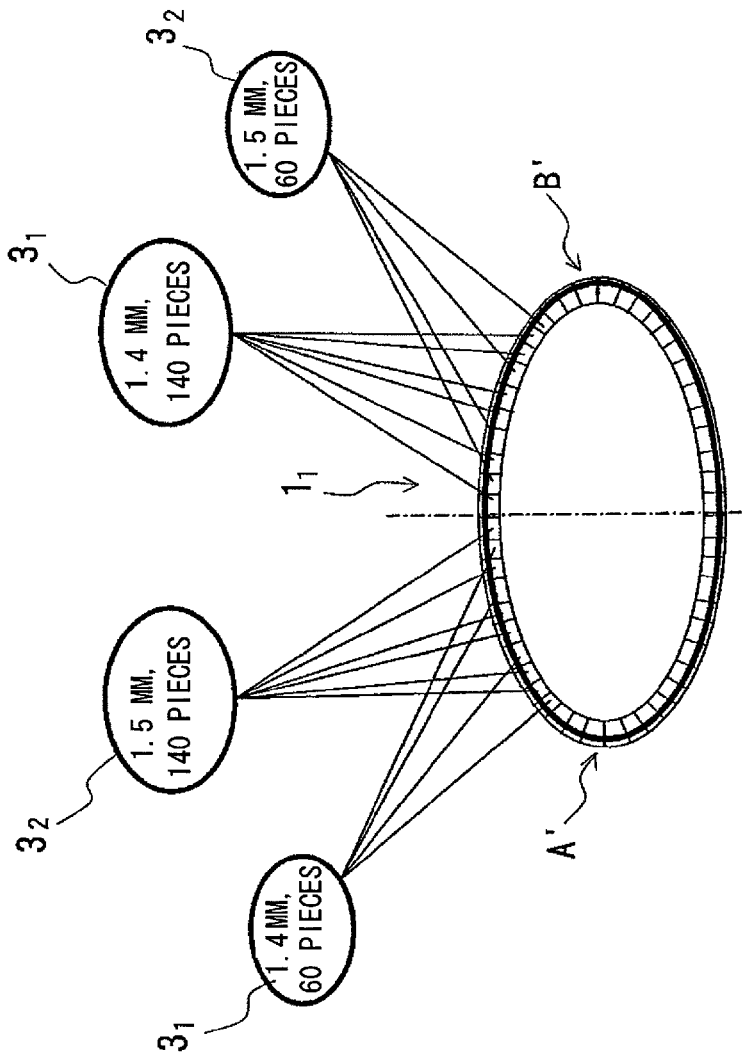
FIG. 5 is a drawing for explaining a combination and arrangement specified belt.

In an exemplary embodiment of the present invention, as shown in FIG. 5, the combination specified belt can comprise an arrangement specified belt $1_1$ in which an order (arrangement) of the first blocks $3_1$ and the second blocks $3_2$ is adequately specified. Each half of the arrangement specified belt $1_1$ is formed of a first block group A' having 60 pieces of a first block $3_1$ and 140 pieces of a second block $3_2$, and a second block group B' having 140 pieces of a first block $3_1$ and 60 pieces of a second block $3_2$. The arrangement and order of the first blocks $3_1$ and the second blocks $3_2$ can be specified so as to lower the noise in the first and second block groups A' and B'. Thereby, a dispersion of frequency of appearance of peaks, described later, caused by an order of the first and second blocks within each block group may be reduced. It is noted that although the ratio of the number of the first blocks $3_1$ and the second blocks $3_2$ has been equalized to be one-to-two (two-to-one) in the first and second block groups A' and B' in the belt $1_1$, a different ratio may be used in the both block groups such that the ratio is one-to-three in the first block group and is two-to-one in the second block group, for example.

Figure 6:
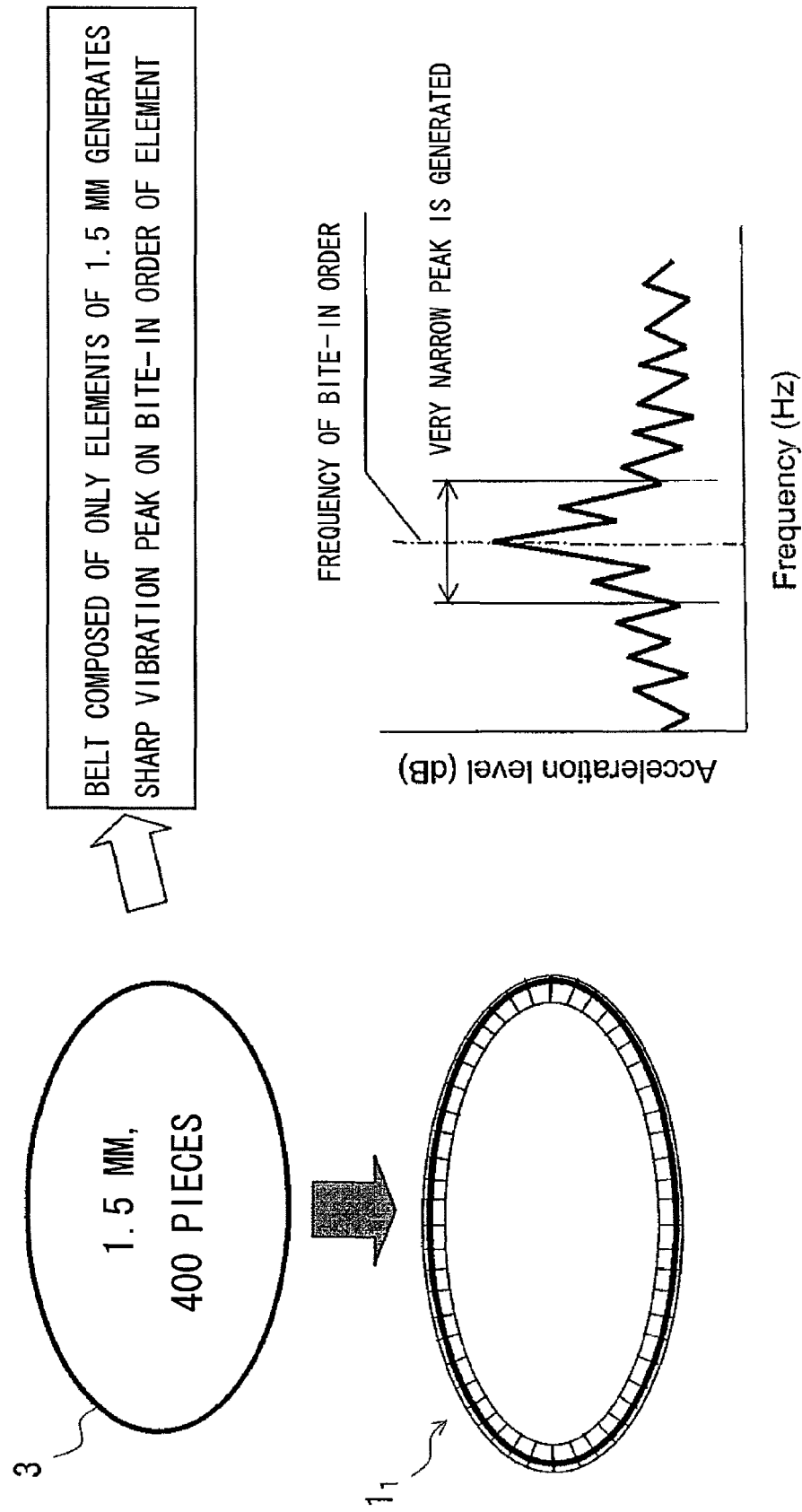
FIG. 6 is a drawing for explaining noise levels when the same V blocks are used.
Figure 7:
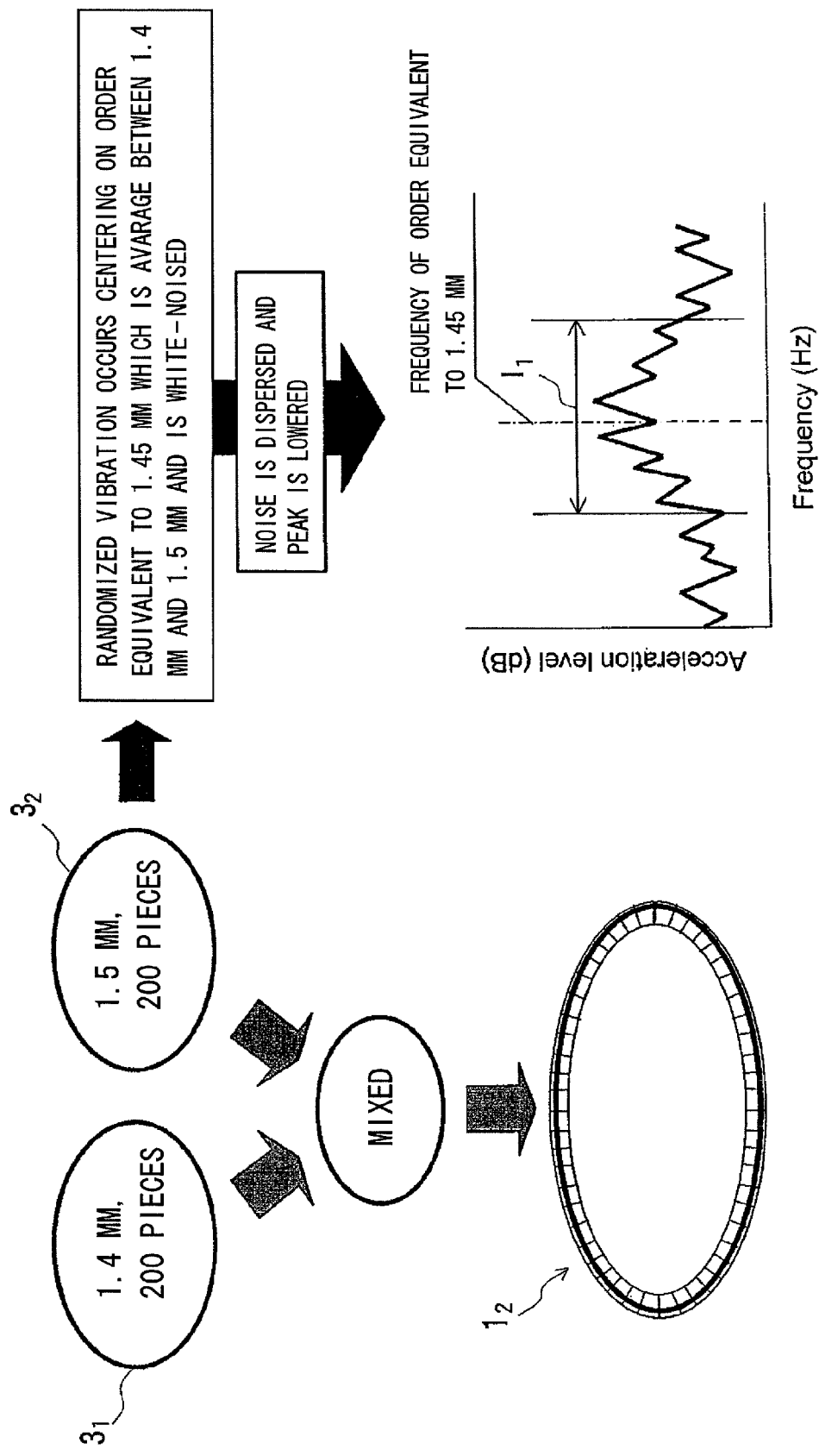
FIG. 7 is a drawing for explaining noise levels of the randomly mixed belt.

As described with respect to the conventional technology, a belt $1_1$ composed of only one type of block, e.g., the second blocks $3_2$ whose thickness is 1.5 mm, generates noise irritating to human ears every time the blocks bite into the pulleys and has a sharp peak in a very narrow frequency band, as shown in FIG. 6. The randomly mixed belt $1_2$ in which the same number of first and second blocks $3_1$ and $3_2$ are mixed and are arranged at random generates noise whose peak is dispersed and centered on an order equivalent to the mean value of 1.45 mm and whose width $I_1$ is widened as the peak is lowered, as shown in FIG. 7.

Figure 8:
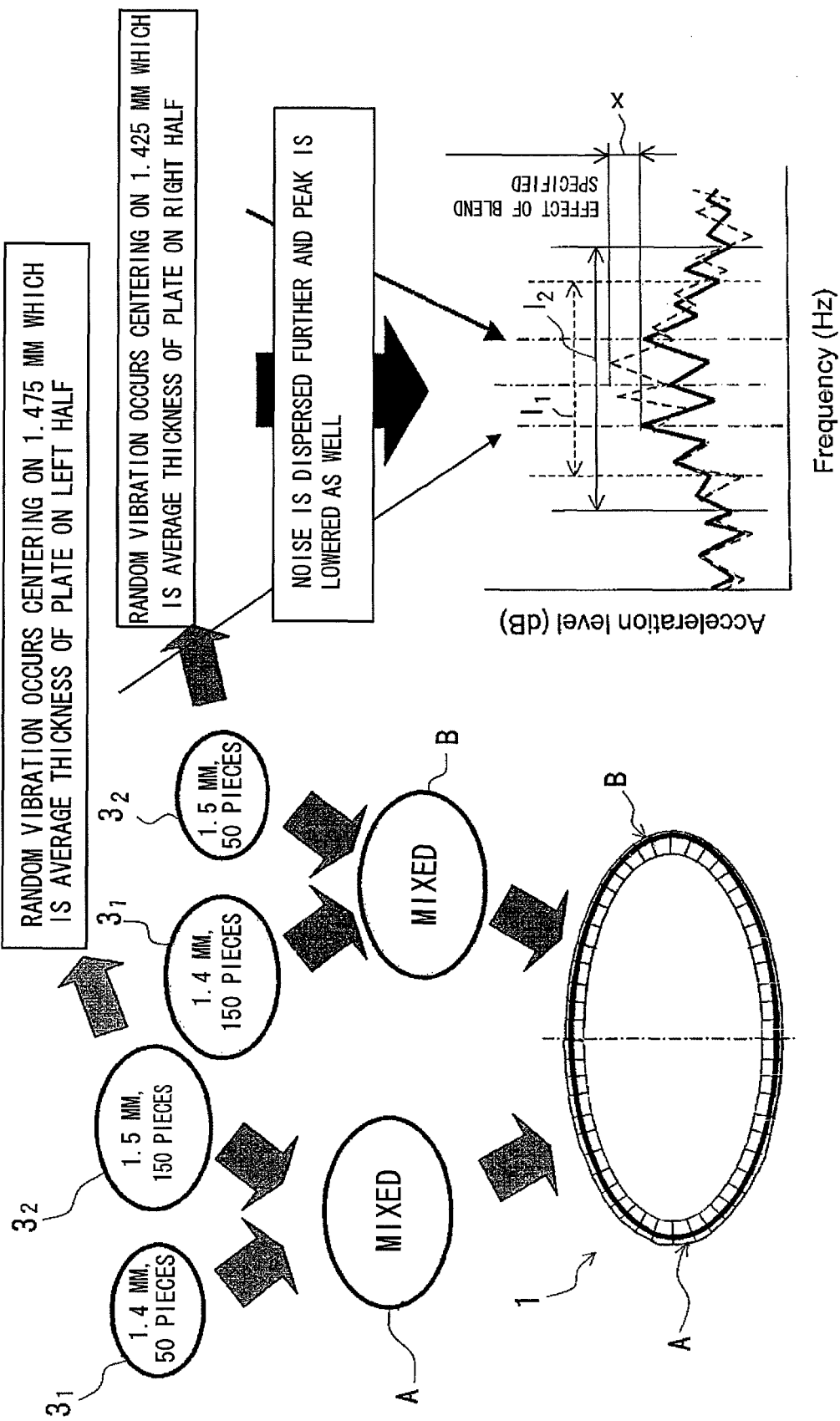
FIG. 8 is a drawing for explaining noise levels of the combination specified belt.

As shown in FIG. 8, the combination specified belt 1 whose half is assembled by the first block group A in which 50 pieces of first block $3_1$ and 150 pieces of second block $3_2$ are mixed and arranged at random (e.g., the ratio of combination is one-to-three) and whose other half is assembled by the second block group B in which 150 pieces of first block $3_1$ and 50 pieces of second block $3_2$ are mixed and arranged at random (e.g., the ratio of combination is three-to-one) causes random vibration centering on the average thickness of 1.475 mm in the first block group A and causes random vibration centering on the average thickness of 1.425 mm in the second block group B. Thereby, as compared to the randomly mixed belt described above, the noise is dispersed further and the peak is lowered as well. That is, a width $I_2$ of the peak frequency is widened more than the width $I_1$ of the frequency of the randomly mixed belt, as indicated by a dotted line, and the noise level [dB] is lowered by x [dB] as compared to that of the randomly mixed belt. These features represent an exemplary effect of the combination specified belt 1.

Figure 9:
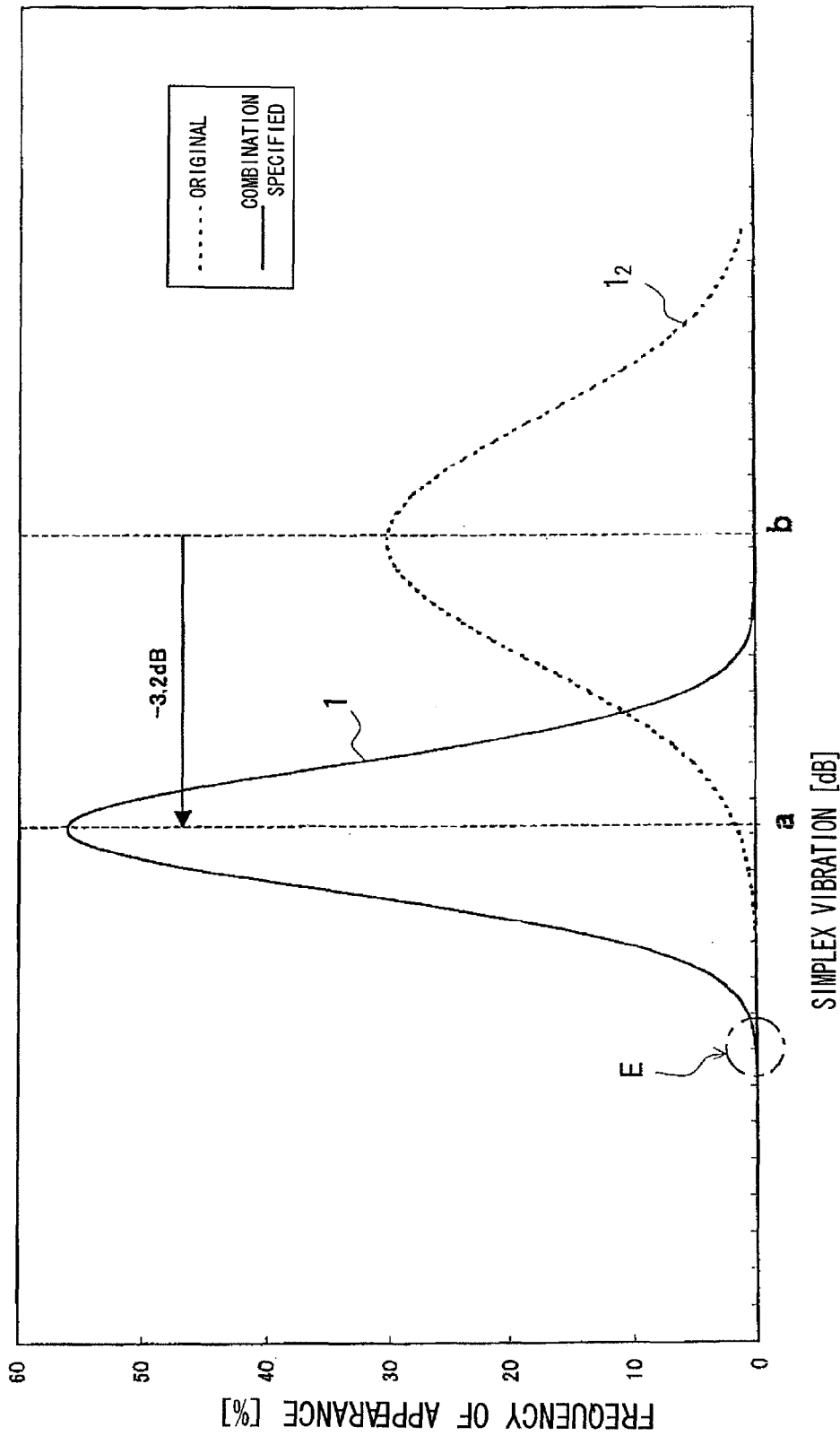
FIG. 9 is a chart showing a frequency of appearance during simulation of the original belt and the combination specified belt.

FIG. 9 is a chart showing simulation results for analyzing simplex vibration which is caused when the combination specified belt bites into the pulleys, for which a large number of first and second block groups A and B that are formed on a computer. In FIG. 9, the solid line indicates results of the combination specified belt 1 and the broken line indicates results of the randomly mixed (original) belt $1_2$, shown in FIG. 7, after trying 1,000 different arrangements of V blocks, respectively. In FIG. 9, Simplex Vibration [dB] on the axis of abscissas indicates peaks of simplex vibration in the simulation of N=K times and Frequency of Appearance [%] on the axis of ordinates indicates a rate of appearance of peaks of simplex vibration [dB] in each simulation. It is noted that the results of the original belt $1_2$ simulation represents simplex vibration when the first V blocks whose thickness is 1.4 mm and the second V blocks whose thickness is 1.5 mm are combined with a specified ratio of 50-to-50 and whose arrangement (order) is specified to be different individually. The results of the combination specified belt 1 represents simulation of simplex vibration when the first V blocks whose thickness is 1.4 mm and the second V blocks whose thickness is 1.5 mm are used in the same manner. The front half part of the belt is the block group in which the ratio of a number of the first and second V blocks is three-to-seven and the rear half part is the block group in which the ratio is seven-to-three. Different arrangements may be specified respectively in each block group.

As shown in FIG. 9, the original belt $1_2$ has a central value (about 30%) where the frequency of appearance is maximized at the simplex vibration b [dB] and the peaks are distributed in a relatively wide range. In contradistinction, the combination specified belt 1 described above has a central value (about 57%) where the frequency of appearance is maximized at the simplex vibration a [dB] and the peaks are distributed in a relatively narrow range. As compared to the central value b of the original belt described above, the central value a of the combination specified belt is lower by about 3.2 dB and its height is higher by about 1.9 times. Still more, its distribution range is narrower than that of the original belt by about 60%. Accordingly, most of the combination specified belts 1 cause less noise to be generated when the belts bite into the pulleys, as compared to that of the original (randomly mixed) belt $1_2$. Statistically, the noise is reduced by about 3.2 dB.

Next, explained is a process in which a combination and arrangement specified belt having a low simplex vibration is selected among the combination specified belts.

Figure 10:
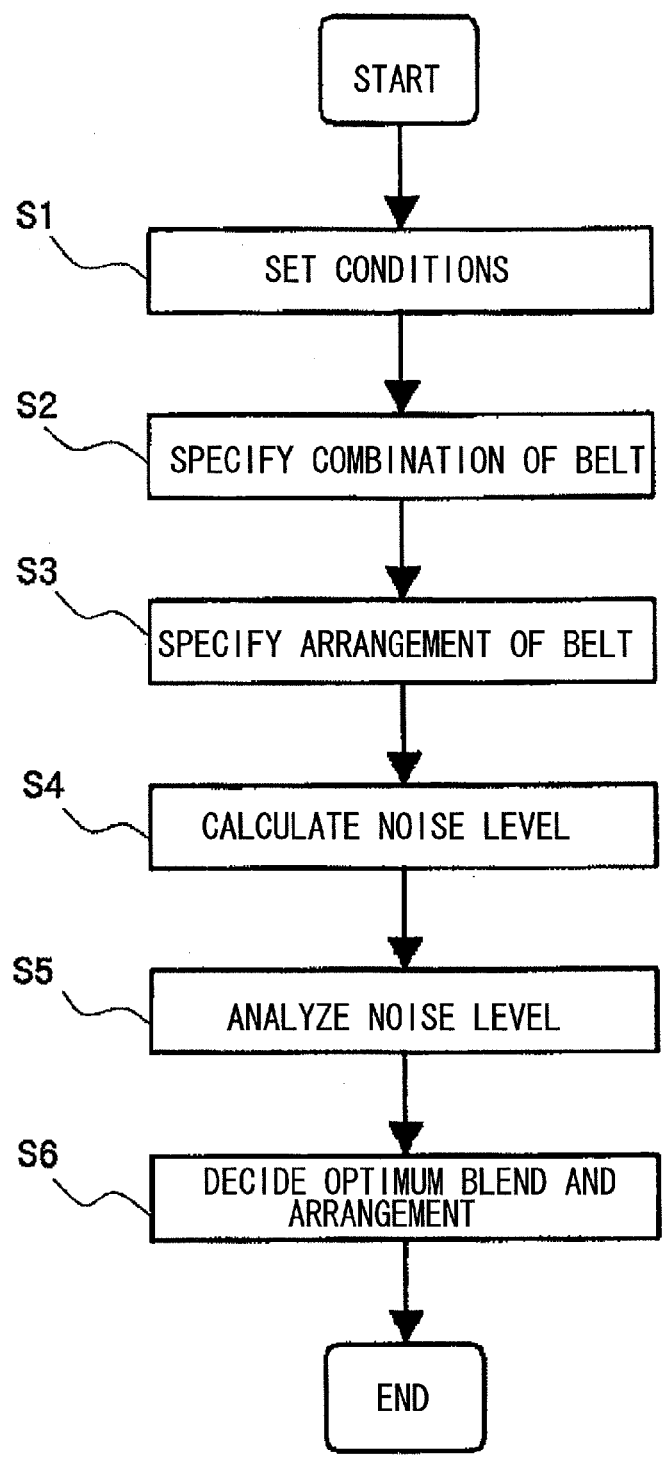
FIG. 10 is a flowchart showing a manufacturing method of an exemplary embodiment of the present invention.

As shown in FIG. 10, a simulation of a combination and arrangement specified belt in operations S1 through S5 is carried out. That is, conditions related to the components of the belt, such as the shape of the V block, length of the belt and a number of rings, rotational conditions when the belt is mounted on the CVT and is rotated, such as pulley (sheave) rotational speed and others are set as boundary conditions for carrying out the simulation in operation S1.

Further, the belt is divided into a plurality of parts and the ratio of combination concerning the thicknesses of the V block groups to be attached to the divided parts is set in operation S2. In particular, the belt is divided into two parts, and the ratio of a number of the first V blocks (t=1.4 mm) to the second V blocks (t=1.5 mm) is set at three-to-seven in the first V block group to be attached in the front half part of the belt. The ratio of a number of the first and second blocks is set at seven-to-three in the second V block group to be attached in the rear half part of the belt.

The arrangement (order) of the first and second V blocks is changed at random in the first and second V block groups within the range of the above rate (ratio) to create a large number of combination and arrangement specified belts on a computer in operation S3. In particular, 1,000 arrangement patterns are created. Then, a simulation of the large number of belts, thus created and mounted in a CVT and rotated, is carried out to calculate noise levels on the computer in operation S4.

Then, the noise level calculated per belt described above is analyzed to decide the optimum combination and arrangement specified belt in operations S5 and S6. For example, the noise level is analyzed by the sound pressure (dB) and a number of belts in that sound level. The frequency of appearance [%], as shown in FIG. 9, in operation S5, is determined to specify the optimum combination and arrangement specified belt among the analyzed noise levels, i.e., the belt at E in FIG. 9. Thereby, the optimum combination and arrangement specified belt is decided in the computer simulation with respect to the noise level.

An example of a belt in which the first V blocks and the second V blocks are mixed at random is shown in FIG. 12. An example of the combination specified belt composed of the first V block group in which the first and second V blocks are combined in the ratio of three-to-seven and the second V block group in which the first and second V blocks are combined in the ratio of seven-to-three is shown in FIG. 13. The combination and arrangement specified belt that brought about the best result with respect to the noise level as the result of computer simulation is shown in FIG. 14.

Figure 11:
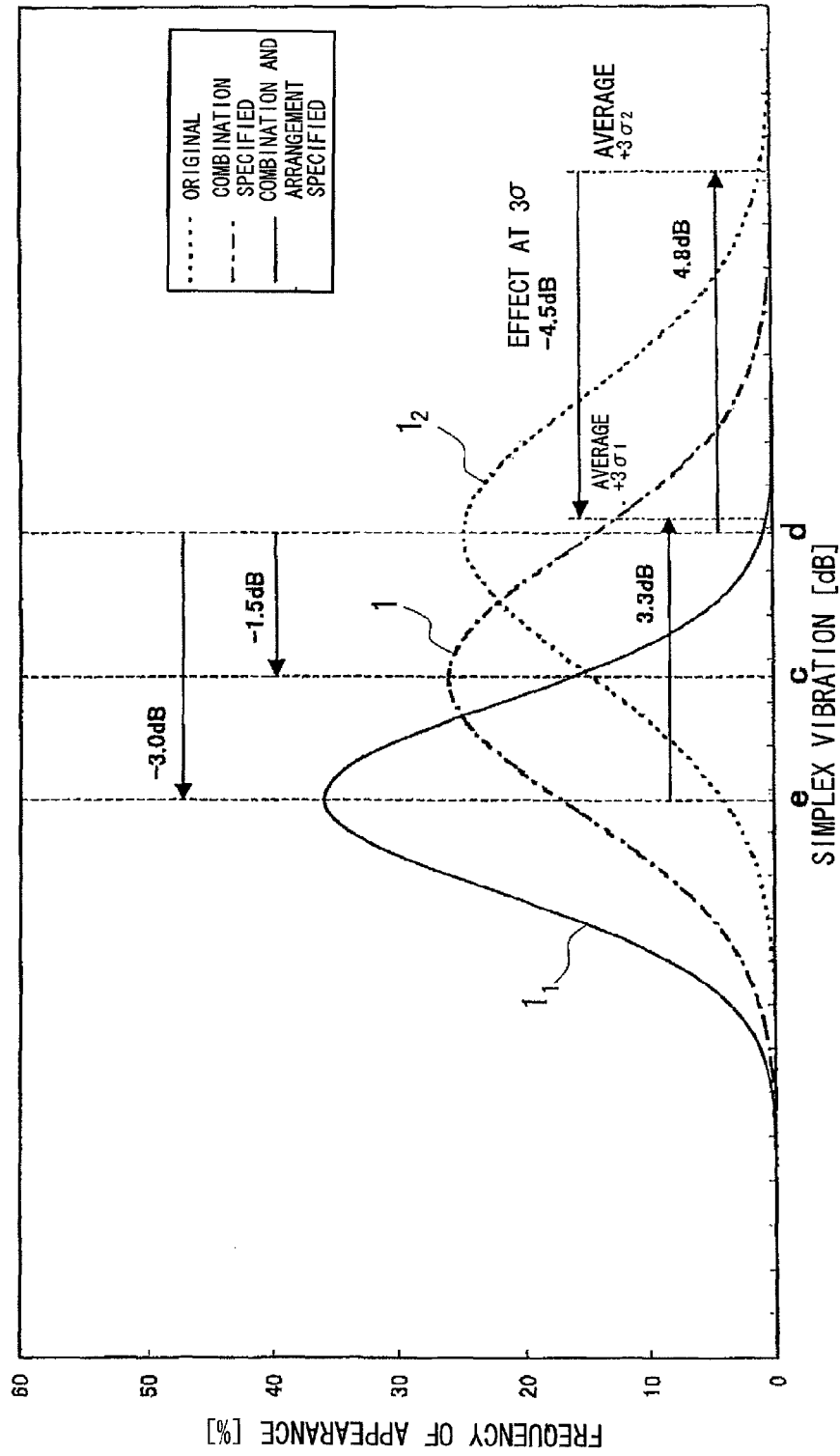
FIG. 11 is a chart showing results obtained by measuring respective belts.

Next, the results of an actual measurement carried out using the above-mentioned belts will be explained with reference to FIG. 11. A large number of randomly mixed belts $1_2$, combination specified belts 1 and combination and arrangement specified belts $1_1$ prepared with the combinations shown in FIGS. 12, 13 and 14 are actually produced. While each belt differs slightly due to allowance, error and others, the belts were actually wound across the pulleys and operated to measure the generated simplex vibration (sound pressure and noise level) [dB]. In FIG. 11, the axis of abscissas represents the actually measured simplex vibration and the axis of ordinates represents frequency of appearance [%] of the belts having the peak value of the simplex vibration of each belt. The dotted line indicates the original (randomly mixed) belt $1_2$, the dotted chain line indicates the combination specified belt 1 and the solid line indicates the combination and arrangement specified belt $1_1$. As is apparent from the graph, the maximum value of the frequency of appearance of the combination specified belt is lower than that of the original belt by 1.5 dB (=d−c) and that of the combination and arrangement specified belt is lower than that by 3.0 dB (=d−e).

Moreover, specifying the arrangement allows the dispersion caused by the arrangement to be reduced. When the dispersion is compared by using standard deviation as an index, the deviation $\sigma_1$ of the original belt is 1.6 dB and that of the combination and arrangement specified belt is 1.1 dB. Accordingly, it can be seen that the value of deviation is reduced when the arrangement is specified. Still more, in addition to the average value being reduced by 3 dB, when values (average value+$3\sigma_1$) and (average value+$3\sigma_2$) obtained by adding $3\sigma_1$ and $3\sigma_2$ to the average value of each belt is compared, the combination and arrangement specified belt is lower than the original belt by 4.5 dB. That is, it is shown that the large noise level of the original belt may be reduced considerably by specifying the combination and arrangement of the V blocks.

It is noted that the CVT belt described above used a ring composed of laminated metal sheets as the endless body however, the invention is not limited to that and is also applicable, for example, to using a link chain in which link plates are linked by pins, and the like.

Although illustrative, non-limiting embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method for manufacturing a belt for a continuously variable transmission (CVT), the belt comprising V blocks including first V blocks having a first thickness and second V blocks having a second thickness, the method comprising:
   designing a configuration for the belt, wherein the designing comprises:
      designing a first V block group comprising first V blocks and second V blocks provided at a first ratio;
      designing a second V block group comprising first V blocks and second V blocks provided at a second ratio; and
      determining the first ratio and the second ratio so that the first ratio is different from the second ratio; and
   after the designing the configuration for the belt has completed, then manufacturing the belt by attaching the first V block group and the second V block group to an endless belt.

2. The method according to claim 1, wherein the first ratio and the second ratio are determined such that the V blocks of the manufactured belt generate a lower noise level by abutting against pulleys of the CVT as compared to a randomly mixed belt configured such that all first V blocks and second V blocks of the randomly mixed belt are randomly ordered.

3. The method according to claim 2, wherein the lower noise level comprises a maximum value of frequency appearance that is at least 3.2 dB less than that of the randomly mixed belt.

4. The method according to claim 3, wherein the lower noise level comprises a maximum value of frequency appearance that is at least 4.5 dB less than that of the randomly mixed belt.

5. The method according to claim 1, wherein the first ratio and the second ratio are determined such that if the first ratio is expressed x/y, then the second ratio is expressed as y/x.

6. The method according to claim 1, wherein none of the V blocks of the first V block group and none of the V blocks of the second V block group are attached to the endless belt before the designing the configuration for the belt has been completed.

7. The method according to claim 1, wherein the designing the first V block group and the designing the second V block group comprise:
   assembling, on a computer, a plurality of model belts, wherein each one of the model belts is configured with a different order for each respective one of the first V blocks and the second V blocks in each of the first V block group and the second V block group, respectively;
   simulating, on the computer, a state in which each one of said model belts is respectively abutted against pulleys to calculate a noise level generated by each respective one of the model belts; and
   analyzing the calculated noise level generated by each respective one of the model belts to determine which one of the model belts generates a lowest noise level.

8. A method for designing a belt for a continuously variable transmission (CVT), the method comprising:
   dividing V blocks into a first V block group and a second V block group,
      wherein the V blocks comprise first V blocks having a first thickness and second V blocks having a second thickness;
   determining a first ratio relating a number of the first V blocks to a number of the second V blocks;
   determining a second ratio relating a number of the first V blocks to a number of the second V blocks, the second ratio being different from the first ratio;
   after determining the first ratio and the second ratio, then:
      specifying, on a computer, a plurality of different orders for each respective one of the first V blocks and the second V blocks in each of the first V block group and the second V block group, respectively, so as to assemble, on the computer, a plurality of model belts;
      simulating, on the computer, a state in which each one of the model belts is respectively abutted against pulleys to calculate a noise level generated by each respective one of the model belts; and
      analyzing the calculated noise level generated by each respective one of the model belts to determine which one of the model belts generates a lowest noise level.

9. The method according to claim 8, further comprising manufacturing the belt for the CVT based on the one of the model belts determined to have the lowest noise level.

10. A method for designing a belt for a continuously variable transmission (CVT), the method comprising:
    selecting V blocks comprising first V blocks having a first thickness and second V blocks having a second thickness;
    specifying, on a computer, a plurality of different orders for each respective one of the first V blocks and the second V blocks, so as to assemble, on the computer, a plurality of model belts;
    simulating, on the computer, a state in which each one of the model belts is respectively abutted against pulleys to calculate a noise level generated by each respective one of the model belts; and
    analyzing the calculated noise level generated by each respective one of the model belts to determine which one of the model belts generates a lowest noise level.

11. A method for manufacturing a belt for a continuously variable transmission (CVT), the method comprising:
    selecting V blocks to be attached an endless belt, the V blocks comprising first V blocks having a first thickness and second V blocks having a second thickness;
    determining a combination specified configuration for the first V blocks and the second V blocks that will generate a lower noise level by abutting against pulleys of the CVT as compared to a randomly mixed belt configured such that an order of all first V blocks and second V blocks of the randomly mixed belt is randomly mixed;
    wherein the determining the combination specified configuration comprises:
       dividing the V blocks to be attached to the endless belt into a first V block group and a second V block group;
          wherein the first V block group comprises first V blocks and second V blocks provided at a first ratio,
          wherein the second V block group comprises first V blocks and second V blocks provided at a second ratio; and
       selecting the first ratio and the second ratio so that the second ratio is different from the first ratio; and
    attaching the first V block group and the second V block group to the endless belt in the determined combination specified configuration.

* * * * *